United States Patent
Shrivastava et al.

(10) Patent No.: US 11,972,413 B2
(45) Date of Patent: *Apr. 30, 2024

(54) DIGITAL WALLET PROMOTIONS THROUGH TOKENIZATION PLATFORM

(71) Applicant: MASTERCARD INTERNATIONAL INCORPORATED, Purchase, NY (US)

(72) Inventors: Nitin Shrivastava, Stamford, CT (US); Vivek S. Yadav, Hoboken, NJ (US); Claudia Alexandra Baron-Aoudal, New York, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/093,559

(22) Filed: Jan. 5, 2023

(65) Prior Publication Data

US 2023/0153797 A1    May 18, 2023

Related U.S. Application Data

(63) Continuation of application No. 16/294,090, filed on Mar. 6, 2019, now Pat. No. 11,562,348.

(51) Int. Cl.
*G06Q 20/36* (2012.01)
*G06Q 30/0207* (2023.01)

(52) U.S. Cl.
CPC ..... *G06Q 20/3672* (2013.01); *G06Q 30/0215* (2013.01)

(58) Field of Classification Search
None
See application file for complete search history.

(56) References Cited

U.S. PATENT DOCUMENTS

| 8,788,333 | B2 * | 7/2014 | Alba | G06Q 20/36 705/52 |
| 9,721,268 | B2 * | 8/2017 | Bondesen | G06Q 20/36 |

(Continued)

FOREIGN PATENT DOCUMENTS

JP    2014519657 A    8/2014

OTHER PUBLICATIONS

International Search Report and Written Opinion dated Jun. 30, 2020 which was issued in connection with PCT/US20/020063.

(Continued)

*Primary Examiner* — Paul S Schwarzenberg
(74) *Attorney, Agent, or Firm* — Buckley, Maschoff & Talwalkar LLC

(57) ABSTRACT

Provided are systems and methods enabling enrollment in promotions via a tokenization platform. In one example, the method may include establishing a network communication channel between a tokenization platform and a digital wallet of a user device, transmitting a promotion from the tokenization platform to the digital wallet on the user device via the established network communication channel, receiving authorization to accept the promotion at the tokenization platform from the digital wallet on the user device, and identifying tokenized payment account information of the digital wallet stored at the tokenization platform and automatically transmitting information about the tokenized payment account information of the digital wallet information from the tokenization platform to a promotion enrollment system associated with the promotion. The example embodiments use existing payment network infrastructure to provide seamless promotional enrollment through a tokenization platform instead of a standalone website.

17 Claims, 7 Drawing Sheets

(56) References Cited

U.S. PATENT DOCUMENTS

| | | | |
|---|---|---|---|
| 9,780,953 B2* | 10/2017 | Gaddam | ............... H04L 9/3215 |
| 10,412,060 B2* | 9/2019 | Narayan | ................... H04L 9/14 |
| 10,546,315 B2* | 1/2020 | Mitchell | ............ G06Q 30/0238 |
| 11,172,047 B2* | 11/2021 | Kaulbach | ................ H04L 67/01 |
| 2013/0041743 A1* | 2/2013 | Coppinger | ......... G06Q 30/0239 |
| | | | 705/14.36 |
| 2013/0325604 A1* | 12/2013 | Yeri | ....................... G06Q 40/02 |
| | | | 705/14.53 |
| 2014/0188586 A1 | 7/2014 | Carpenter et al. | |
| 2015/0127457 A1 | 5/2015 | Feldman | |
| 2015/0254699 A1 | 9/2015 | Bondesen et al. | |
| 2017/0124548 A1* | 5/2017 | Bolla | .................... H04W 4/023 |
| 2018/0253727 A1* | 9/2018 | Ortiz | .................... G06Q 20/023 |
| 2020/0082387 A1* | 3/2020 | Salama | .............. G06Q 20/3829 |

OTHER PUBLICATIONS

892 Form dated Feb. 17, 2021 with was issued in connection with U.S. Appl. No. 16/294,090.

892 Form dated Aug. 16, 2021 with was issued in connection with U.S. Appl. No. 16/294,090.

The Supplementary European Search Report and Written Opinion dated Oct. 13, 2022 which was issued in connection with EP 20767184.

Notice of Allowance dated Oct. 16, 2022 with was received in U.S. Appl. No. 16/294,090.

\* cited by examiner

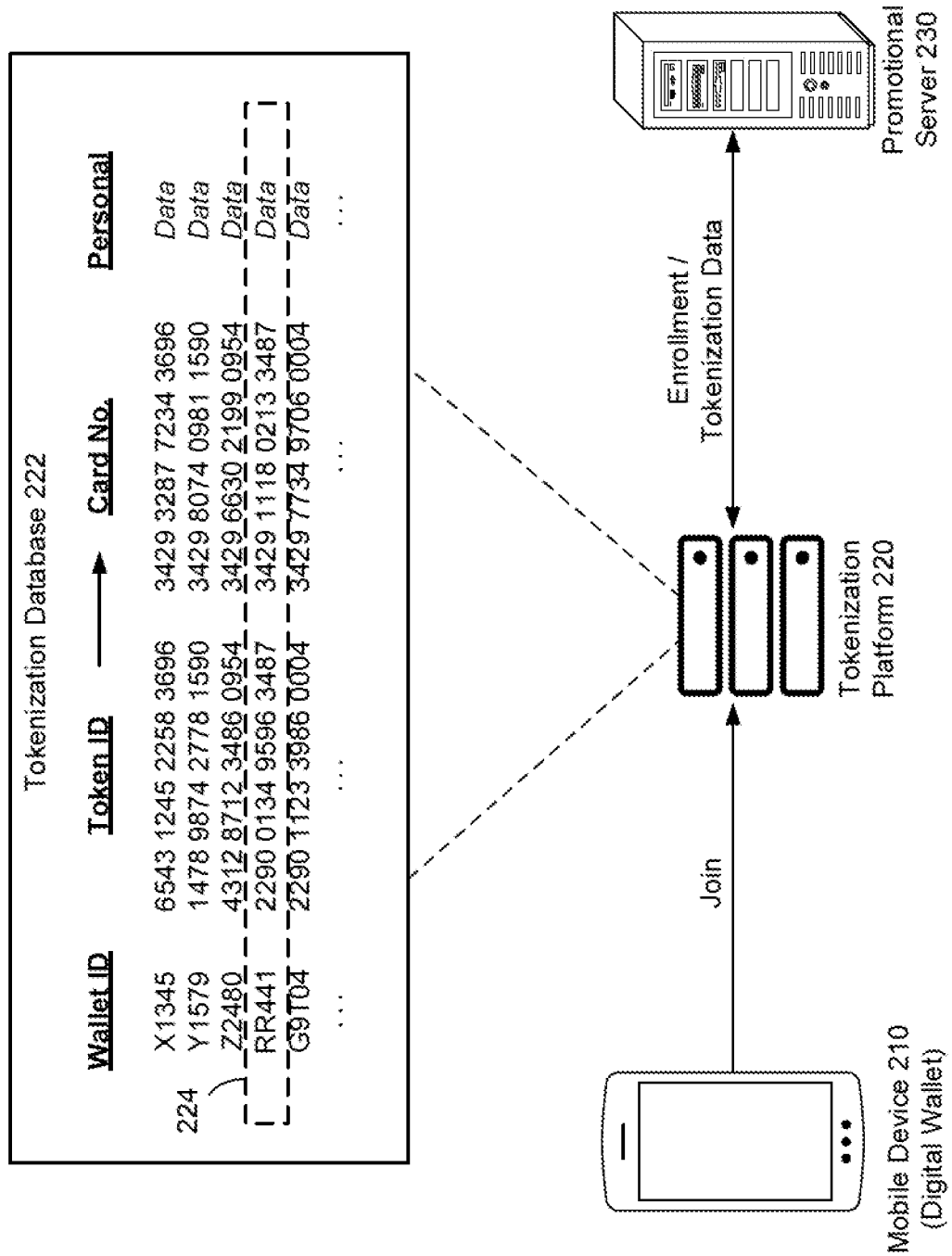

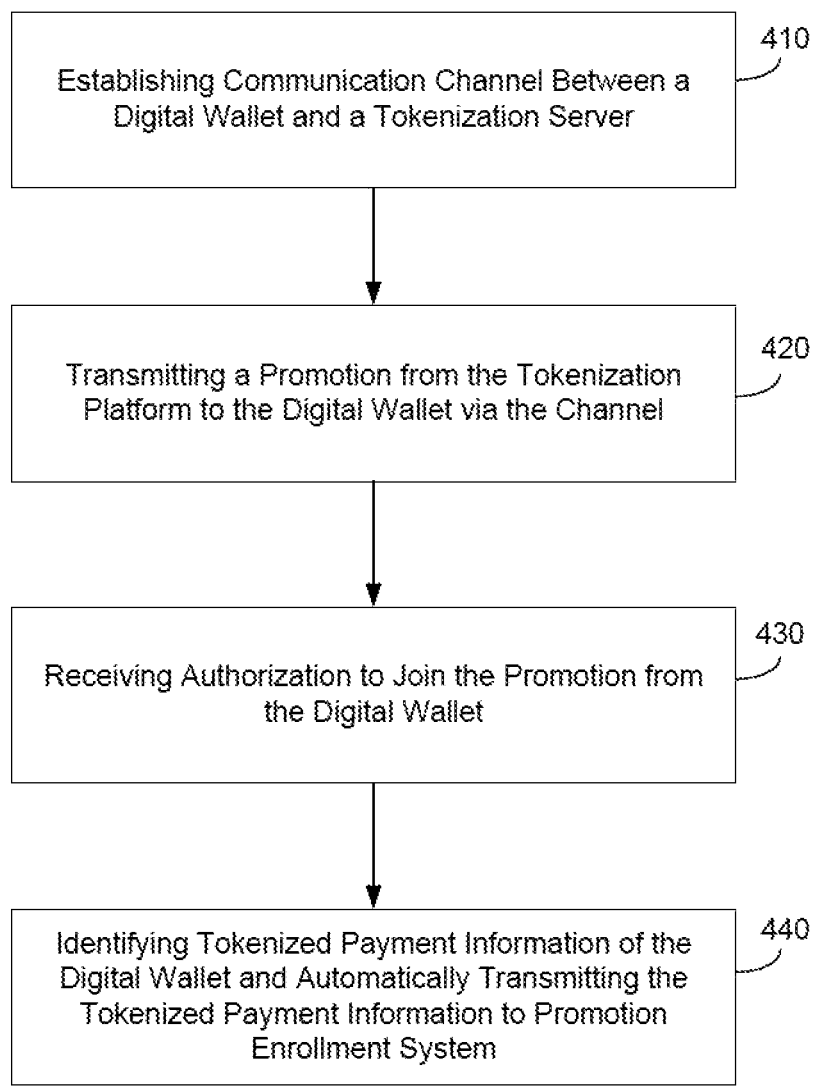

DIGITAL WALLET PROMOTIONS THROUGH TOKENIZATION PLATFORM

CROSS-REFERENCE TO RELATED APPLICATION(S)

This application is a continuation of U.S. patent application Ser. No. 16/294,090, filed on Mar. 6, 2019, in the United States Patent and Trademark Office, the entire disclosure of which is incorporated herein by reference for all purposes.

BACKGROUND

Digital wallets are emerging as a more beneficial way to transact payments in comparison to traditional plastic cards. Digital wallet applications may be installed on a mobile device such as a smartphone, a tablet, a smart wearable, and the like, and can interact with a secure element or trusted execution environment on the mobile device to store payment-related data. Some of the benefits provided by a digital wallet include that card details do not need to be revealed during a transaction with unknown merchants, multiple payment cards can be stored and available in one place, strong marketing campaigns can be provided to wallet users from wallet providers and card issuers, ease of doing transactions without a PIN, a convenient ability to track spending on the mobile device, and ease of enrolling, setting up, and collecting payments on behalf of merchants.

To assist consumers in migrating from traditional plastic cards to digital wallets, promotions and other opportunities may be attached to digital wallets/cards by issuers, wallet providers, etc. An example of a promotion is a cashback reward which is provided to a cardholder after a certain amount of transactions or spending amount has been reached. However, to enroll in a promotion, a digital wallet user must visit a standalone website (outside of the digital wallet) which is associated with the promotion and enroll their digital wallet and payment card by entering sensitive information such as card data, personal information, and the like. Furthermore, in order for promotions to be monitored, a promotion monitoring server must scan a transaction repository and identify transactions associated with each user. The scanning is performed after-the-fact and subsequently credits the promotional benefit to the user's account days or even weeks later. Accordingly, what is needed is a better way for enabling promotions through a digital wallet.

BRIEF DESCRIPTION OF THE DRAWINGS

Features and advantages of some embodiments of the present disclosure, and the manner in which the same are accomplished, will become more readily apparent upon consideration of the following detailed description taken in conjunction with the accompanying drawings.

FIG. 2 is a diagram illustrating a process of automatically enrolling a digital wallet in a promotion according to an example embodiment.

FIG. 4 is a diagram illustrating a method of seamlessly enrolling a payment account in a promotion according to an example embodiment.

Figure 1A:
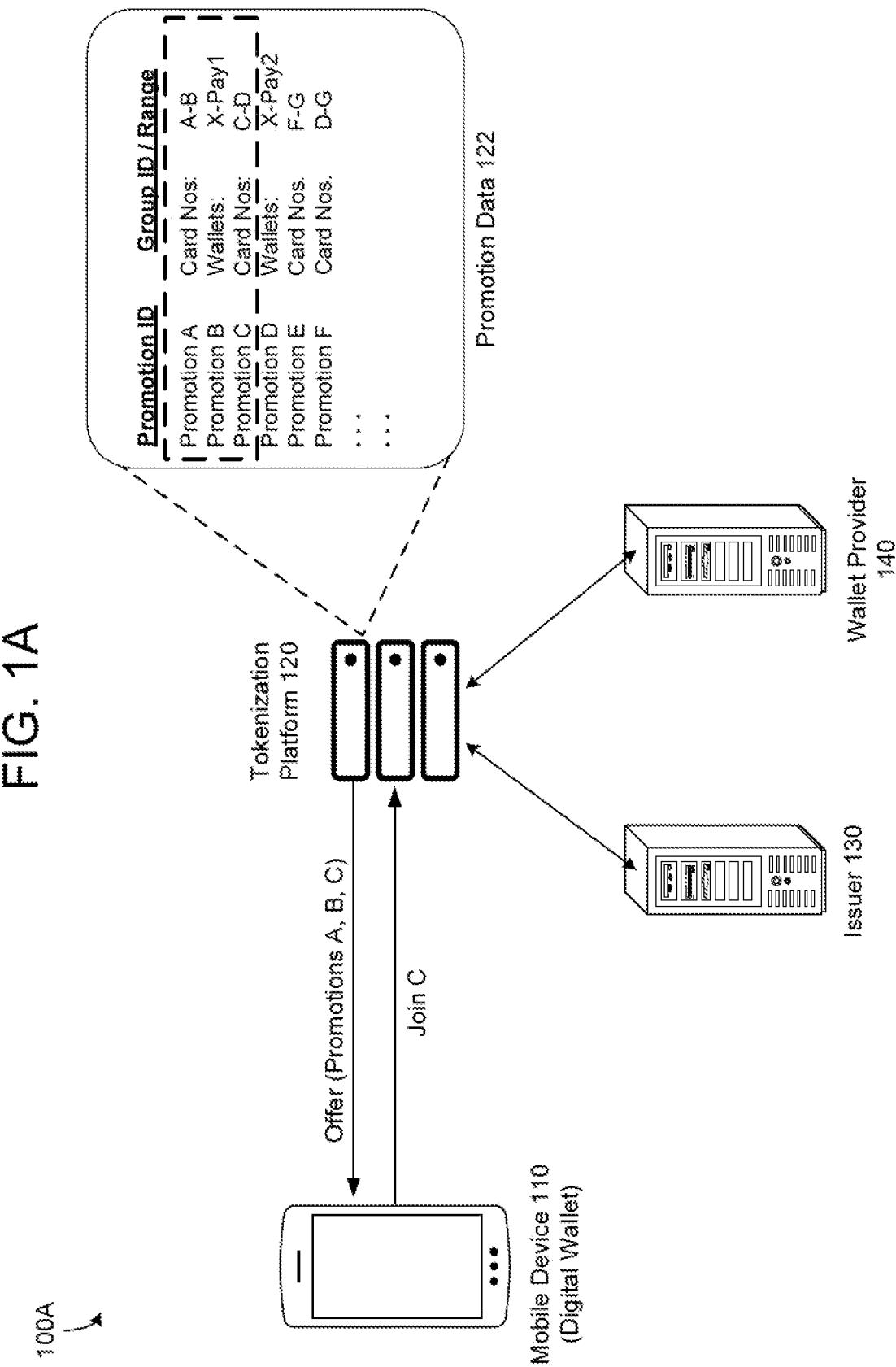
FIG. 1A is a diagram illustrating a process of a tokenization platform pushing promotions to a mobile device according to an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments enable digital wallet promotions through a tokenization platform. That is, rather than requiring a cardholder (wallet user) to visit a website outside of the digital wallet, the example embodiments enable promotions to be offered within the digital wallet application (i.e., in-app) from the tokenization platform. Accordingly, promotions can be pushed to a digital wallet on a mobile device through the same channel in which tokenization of payment card data is performed rather than requiring the cardholder to enroll through a separate website. Furthermore, to enroll, the user simply accepts/joins the promotion and the tokenization platform automatically transfers sensitive cardholder data from the tokenization platform to an enrollment server of the promotion. For example, the tokenization platform may transfer tokenization information such as payment card data, wallet ID, personal data, and the like, securely stored by and transmitted from the tokenization platform to the enrollment server without the data being exposed to a cardholder. As a result, a user does not need to fill out forms or risk transmitting sensitive information over a separate channel.

The solution provided herein enables a tokenization engine (which connects banks and wallets, and tokenizes payment cards) to communicate directly with a cardholder to provide promotions on behalf of issuers, wallet providers, and the like. According to various embodiments, the tokenization engine may be both a combination of a tokenization platform and a promotion engine. The example embodiments enable promotions to be provided through the same rails of the payment network and tokenization process. Prior to this, the only way to enroll in a promotion was through a standalone website hosted by a loyalty platform. Traditionally, this required the user to enter plastic card information, personal information, wallet information, and the like, and enroll in the promotion for a specific wallet. This process was entirely manual and is done at the wallet level.

In order for promotions to be processed, the loyalty program host was required to scan a transaction repository based on a consumer's token requestor ID of the wallet provider to identify transactions performed by the cardholder to determine whether a promotion had been earned. This required the loyalty program host to know the token/payment card and go into the repository and find the transactions through that particular wallet that qualified for a promotion and then apply the promotion retroactively. This process is not scalable. For example, each time the cardholder signed up for a new promotion the cardholder would have to go to a new website and re-enter their information. This was not done through the wallet experience but was done outside of it through a separate website. Also, if a cardholder had the same payment card added to different digital wallets, the cardholder would have to sign up for the promotion separately for each digital wallet. The example embodiments overcome these drawbacks by enabling a tokenization platform such as MasterCard Digital Enablement Services (MDES), or the like, to transfer promotions directly to a cardholder mobile device.

The Payment Card Industry Data Security Standard (PCI DSS) is an industry-wide set of guidelines that must be met by an organization (e.g., merchant, etc.) that stores, processes, or transmits cardholder data. The PCI DSS mandates that credit card data must be protected when it is stored. Tokenization is often implemented to meet this mandate. Tokenization replaces a credit/debit card number or primary account number (PAN) with a non-sensitive value (i.e., a token) such as a random number or string of characters. The token can be used to prevent fraud or unauthorized access to sensitive payment card information.

Tokens can be formatted in different ways including a format of the original sensitive data. For payment cards, the token may have the same length as the PAN and may contain elements of the original data such as the last four digits of the card number, and the like. The token can be stored by the merchant without having to fully adhere to PCI DSS while the actual cardholder data is mapped to the token at a secure tokenization system that is distinct from the merchant. Tokenization creates a token that can turn a mobile device into a payment vehicle which can transact payments at merchant terminals similar to a payment card being swiped or a chip being read, except that the tokenized information may be transmitted wirelessly.

Tokenization enables a cardholder to digitize a payment card and store the digitized payment information on a mobile device. As a result, the mobile device may be used for transacting payments at merchant terminals in a similar manner as a swipe or chip transaction with a plastic card, a fob, or the like. The example embodiments extend the ability of a tokenization platform to communicate directly with the mobile device (digital wallet) to push promotions and other benefits. Furthermore, when a cardholder joins the promotion, the tokenization platform can assist in the enrollment on behalf of the user by transferring sensitive cardholder data stored at the tokenization platform directly to the promotion server, without requiring the user to submit the sensitive information.

Figure 1B:
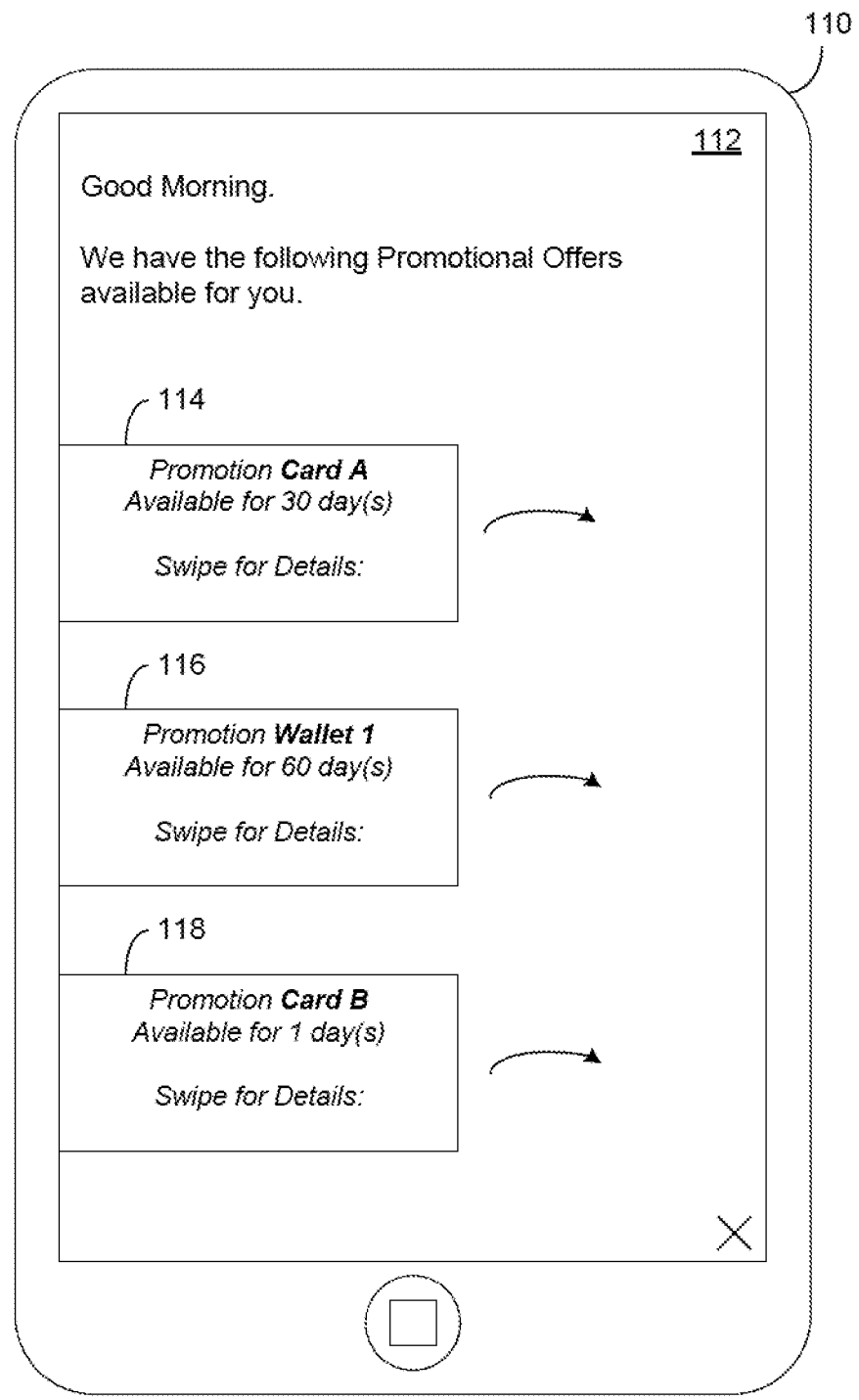
FIG. 1B is a diagram illustrating a user interface displaying promotions received from a tokenization platform according to an example embodiment.

FIG. 1A illustrates a process 100A of a tokenization platform pushing promotions to a mobile device according to an example embodiment, and FIG. 1B illustrates a mobile device 110 displaying promotions received from a tokenization platform according to an example embodiment. Referring to FIG. 1A, a tokenization platform 120 may tokenize payment cards and other accounts into non-sensitive elements which are stored on a mobile device 110. For example, the tokenized payment information may be stored within a secure element and/or a trusted execution environment on the mobile device 110 and may be accessed by and submitted for payments via a digital wallet application including a mobile payment application, a secure remote commerce checkout vault, an e-commerce platform, and the like. Payments may include near-field communication (NFC) payments, online payments, in-app payments, and the like.

In response to successful authorization from a bank that issues the payment card being tokenized, the tokenization platform 120 may "tokenize" sensitive information from the payment card by substituting a token in place of the sensitive payment information. The tokenization platform 120 may replace sensitive data elements (e.g., PAN, expiry, etc.) of the payment card with a non-sensitive equivalent that has no extrinsic or exploitable meaning or value and store the non-sensitive elements within the digital wallet application on the mobile device 110.

As an example, the token (or token ID) may include a random number, a string of characters, or the like. The token itself may not be a payment-enabled card number but is instead a substitute for the card number that has a same format (length, digits, appearance, etc.) as the actual card number without exposing the sensitive card number. Therefore, if an unauthorized party were to gain access to the token, the token number stored on the mobile device 110 can't be extracted into anything valuable for fraudsters. Furthermore, the token fits into a payment message (e.g., payment authorization, payment request, etc.) having an ISO 8583 format which can be processed through existing payment networks.

For example, contactless payment systems enable the mobile device 110 to use near field communication (NFC) or radio-frequency identification (RFID) to transfer payment information wirelessly such as Apple Pay®, Samsung Pay®, Google Wallet®, and the like. The embedded chip and antenna enable consumers to wave or otherwise swipe their handheld device over a reader at a mPOS terminal. Contactless payments are made in close physical proximity, unlike mobile payments which use broad-area cellular or Wi-Fi networks and do not usually involve close physical proximity. As another example, the digital wallet application may also be used for in-app purchases, web transactions, e-commerce payments, and the like.

In addition to tokenizing payment data, the tokenization platform 120 may push promotions to the digital wallet on the mobile device 110. For example, the tokenization platform 120 may receive promotions from various entities such as an issuer computing system 130 and a wallet providing server 140. As another example, the promotions may be configured manually by a user at the tokenization platform 120 on behalf of an issuer, a wallet provider, and the like. As shown in the example of FIG. 1A, promotion data 122 received from these entities may be stored by the tokenization platform 120 in a database or other storage and may include information such as an identification of payment cards (ranges), digital wallet IDs, promotion information (benefit, time period, expiration, etc.) and the like, which are associated with a particular promotion. Furthermore, the tokenization platform 120 may also store notification information such as when (e.g., periodic, immediately, etc.) to transmit the promotion to mobile devices. In this example, the tokenization platform 120 pushes a notification regarding these promotions to the mobile device 110.

An example of a user interface 112 displaying the promotional opportunities (e.g., promotions 114, 116, and 118) on the mobile device 110 is shown in the example of FIG. 1B. The promotions 114, 116, and 118 may be displayed by a user interface 112 that is within the digital wallet executing on the mobile device 110. The promotions 114, 116, and 118 may be provided from the tokenization platform 120 to a direct channel with the mobile device 110 rather than through a separate channel of a website, etc. Accordingly, the promotions can be interacted with directly through a digital wallet rather than requiring a separate website. When the user desires to look deeper into a promotion or join a promotion, the user may make a selection via the user interface 112 of the digital wallet on the mobile device 110. For example, the user may swipe the screen near a selection to reveal more details or even select a join/accept button (not shown).

Referring again to FIG. 1A, when the user selects to join a promotion via the mobile device 110, the selection is provided to the tokenization platform 120 through the direct channel established with the mobile device 110. Here, the channel may include a network such as the Internet, a payment network, a private network, and the like. In response, the tokenization platform can enroll the digital wallet/payment card on the mobile device 110 with a promotional enrollment and monitoring service such as shown and further described below in the example of FIG. 2.

The example embodiments convert the promotional enrollment and monitoring process into the tokenization platform 120 and its corresponding infrastructure. In order to communicate with the tokenization platform 120, the mobile device (digital wallet) may use an application programming interface (API) which includes services and instructions that define how to communicate with the tokenization platform 120 for receiving and selecting promotional offers, as well as for tokenizing payment card data, etc. The example embodiments make life easier for issuers 130 that want to run promotions for a specific card range, digital wallet providers 140 that want to run promotions for a specific wallet, and consumers by enabling enrollment in promotions via the digital wallet on the mobile device 110 rather than a separate site requiring entry of sensitive information.

In the example of FIGS. 1A and 1B, when the wallet provider 140 or the issuer 130 is running a promotion, the user of the mobile device 110 may receive the promotion disclosure right away in the digital wallet application such as through a push notification, an email, an SMS, or the like. Accordingly, the consumer is able to read the promotion details and enroll in the promotion directly from the digital wallet. The benefit is that the promotions and the consent are received through tokenization platform 120 instead of a standalone website. The promotion is being run for the tokenized platform (not plastic cards) and therefore tap and pay may be involved here or any remote transaction via the tokens. The channel for promotions is a single channel between the mobile device (digital wallet) and tokenization platform 120 rather than multiple channels being necessary for receiving and consenting to promotions.

FIG. 2 illustrates a process 200 of automatically enrolling a digital wallet in a promotion according to an example embodiment. Referring to FIG. 2, a tokenization platform 220 pushes a promotional offer to a digital wallet executing on mobile device 210. Here, the digital wallet on the mobile device 210 receives a request or selection to join the promotion and submits the join request directly to the tokenization platform 220. For example, the promotion may be for an existing card in the digital wallet on the mobile device 210. The cardholder may receive an in-app notification through the digital wallet from the tokenization platform 220 and select an option to join the promotion.

The tokenization platform 220 may store tokenized payment information and other cardholder information in a tokenization database 222. Examples of the types of information stored in the tokenization database 222 include a wallet ID, a token, actual account (card) number, personal information of the cardholder, and the like, for each payment account, which are previously registered and stored by the user of the digital wallet. The tokenization database 222 may include a mapping between tokens and actual card data.

In response to receiving the selection to join the promotion, the tokenization platform 220 may automatically enroll the payment card/digital wallet into the promotion behind the scenes without the cardholder having to add payment information, personal information, or the like. For example, the tokenization platform 220 may inform a promotional enrollment and monitoring service (promotional server) 230 about a selection 224 identified by the tokenization platform 220 of the digital wallet on the mobile device 210 to be enrolled into the promotion. Because the sensitive information is transmitted along a channel between the tokenization platform 220 and the promotional server 230, the sensitive information may be kept on a secure network without being exposed through a user device. In this example, the tokenization platform 220 may transmit tokenized payment card data to the promotional server 230. As another example, the tokenization platform 220 may detokenize the payment card based on the mapping stored in the tokenization database 222, and transmit actual payment card data to the promotional server 230. In addition to the payment card information, the tokenization server may also transmit a wallet ID, personal information, and the like, of a wallet account/user associated with the payment card. In some embodiments, the wallet ID may be provided from a wallet provider. As another example, a token requestor identifier (TRID) may be uniquely assigned to every digital wallet that acts as a token requestor with the tokenization platform 220.

Figure 3A:
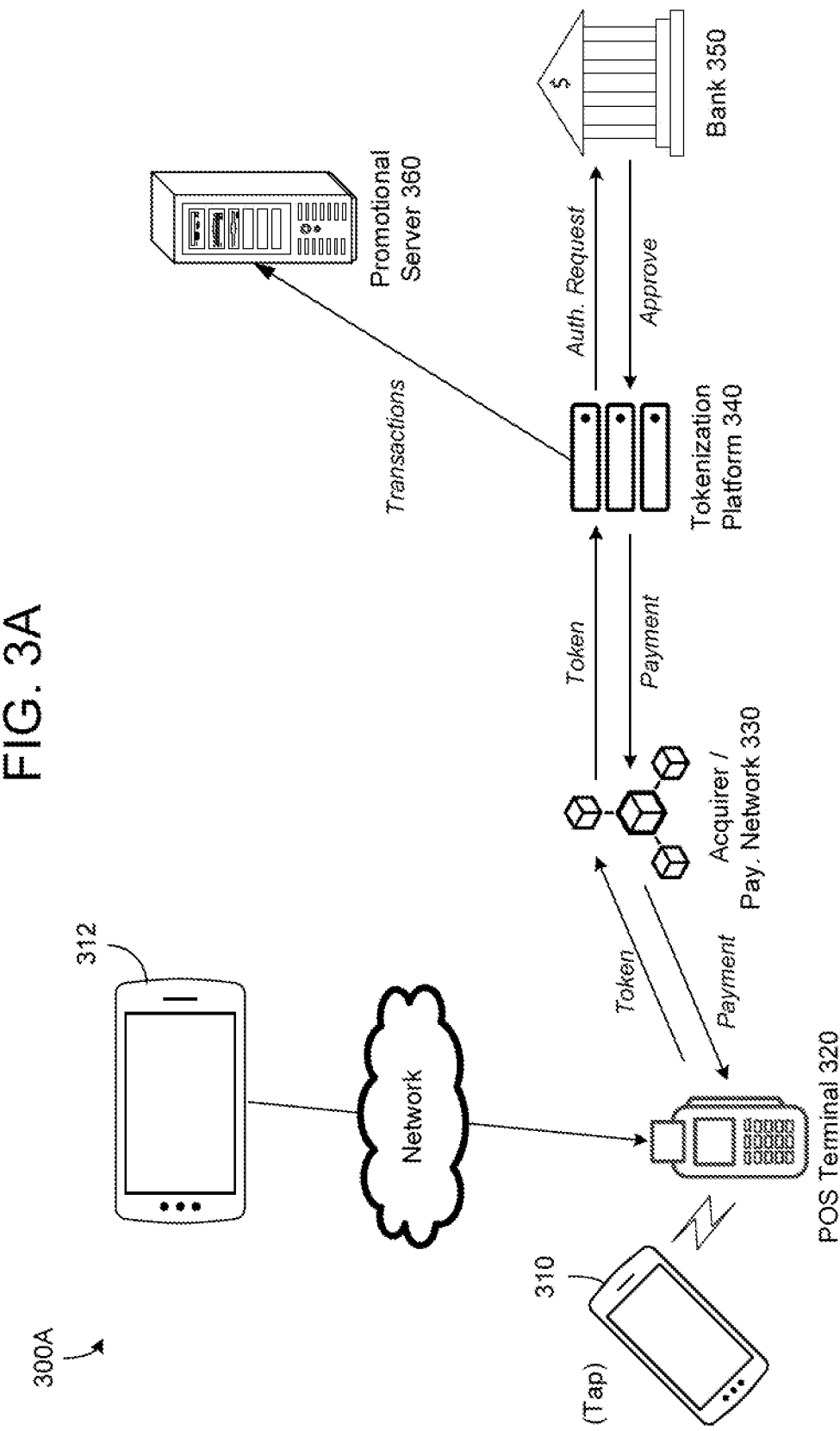
FIG. 3A is a diagram illustrating a process of monitoring promotions through a payment process according to an example embodiment.
Figure 3B:
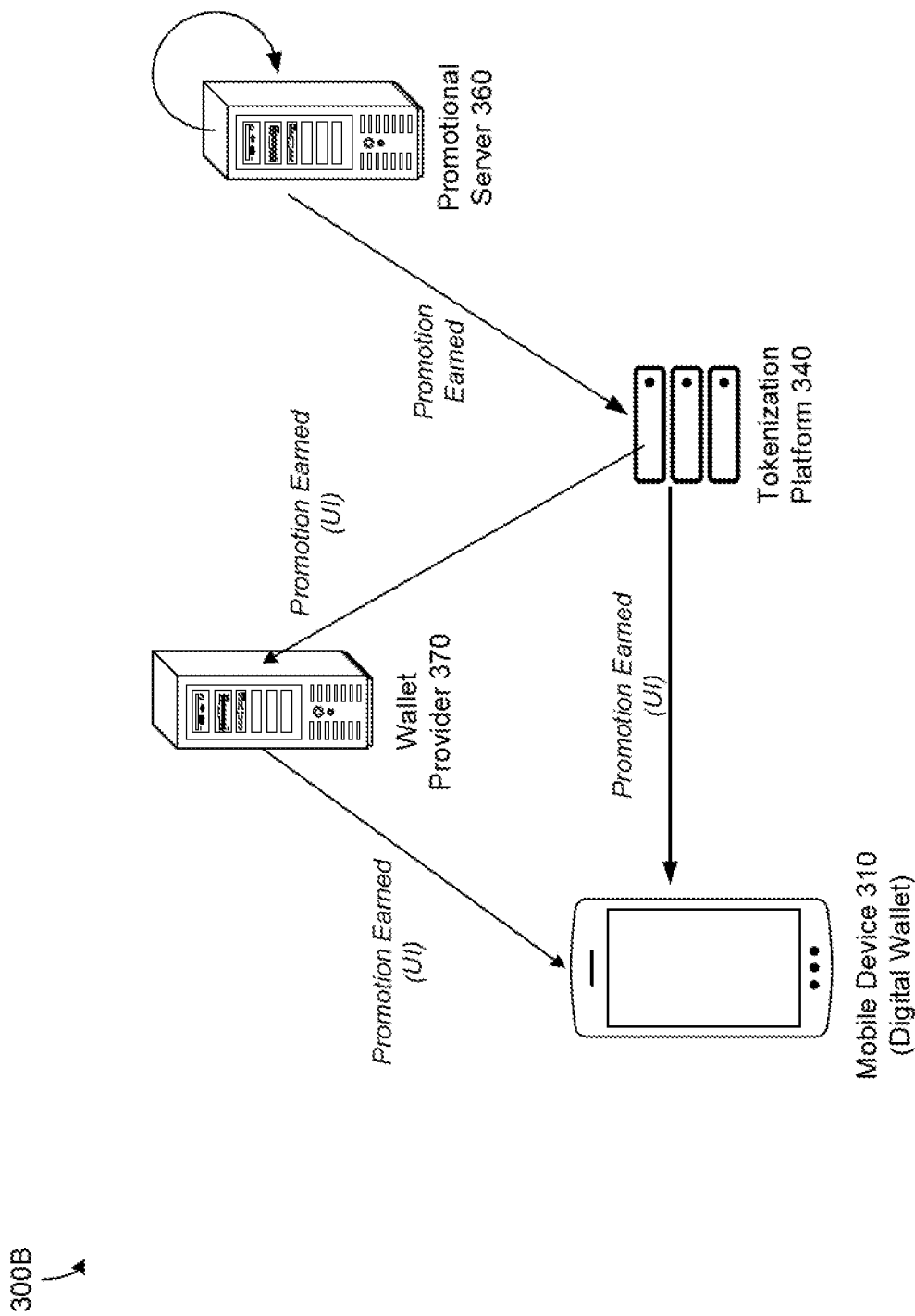
FIG. 3B is a diagram illustrating a process of notifying a digital wallet of a promotion being earned according to an example embodiment.

FIG. 3A illustrates a process 300A of monitoring promotions through a payment process according to an example embodiment, and FIG. 3B illustrates a process 300B of notifying a mobile device that a promotion has been earned according to an example embodiment. Each time a previously enrolled payment card (or digital wallet) is used to conduct a transaction, a tokenization platform 340 may inform a promotional server 360 that the transaction involving a promotion-enabled payment account has occurred.

Referring to FIG. 3A, a mobile device 310 having a digital wallet executing therein may perform a tap payment with a point-of-sale (POS) terminal 320 of a merchant. Here, a payment token may be transmitted from the mobile device 310 to the POS terminal 320 for validation of funding with a bank 350 that issued the payment card associated with the token. Although the example of FIG. 3A illustrates a contactless payment process, it should be appreciated that a similar process can be performed for an online payment at an online merchant terminal, and the like. For example, computing device 312 may perform an e-commerce payment via a network. The payment may be received by the POS terminal 320 from an in-app purchase or web transaction that conducted by computing device 312. Regardless of whether the process 300A is initiated by a tap or via an e-commerce web payment, the other aspects of the process 300A may remain similar or the same.

In response to the tap, the token may be transferred from the POS terminal 320 to the tokenization platform 340 via an acquiring bank 330 of the merchant and a payment network (e.g., payment gateway, payment processor, etc.). The processing of the tap may verify/ensure that funding exists on a payment account mapped to the token. For example, the tokenization platform 340 may identify a payment account/bank associated with the token and transmit an authorization request to the bank 350 via a payment network to ensure that funds are available at the bank 350. In this case, the tokenization platform 340 receives the token, maps the token to the proper payment card information stored at the tokenization platform 340, and requests authorization from the bank 350 based on the information stored at the tokenization platform 340. In response to receiving notice from the bank 350 that the funds are available, the payment is processed successfully and notice is sent to the POS terminal 320.

In the backend, after the payment is completed, the merchant POS terminal 320 may initiate a normal clearing and settlement cycle with the issuer bank 350 through an existing network for transfer of funds from a holding account to a merchant account. Once the authorization request is received by the network and reaches the tokenization platform 340. The tokenization platform 340 may take the token and perform the validation.

According to various embodiments, in addition to process the payment, the tokenization platform 340 may identify payment card transactions which have been enrolled for promotions at the promotional server 360 and transmit transaction data to the promotional server 360. For example, the tokenization platform 340 may pass the transaction data to the promotional server 360 for determining whether the transaction satisfies or otherwise earns a promotion. Here, the promotional server 360 may identify a wallet ID and payment card number (or token) from the transaction for a respective promotion.

Referring to FIG. 3B, in process 300B, the promotional server 360 determines that a promotion has been achieved and pushes a notification of the promotion being earned to the mobile device 310 via the tokenization platform 340. In this example, the promotional server 360 may push an in-app digital wallet notification to the mobile device 310. For example, the promotional server 360 may detect the promotion being achieved, and submit notification to the mobile device 310 via the tokenization platform 340. In the alternative, the notification of the promotion may be transmitted to a wallet provider 370 of the digital wallet on the mobile device 310, which can in-turn forward the promotion earned notification to the mobile device 310 (e.g., the digital wallet application).

As a result, an issuer of the payment card does not need to perform any type of integration with the promotional enrollment system other than providing a card range and the promotion to be turned on for the card range. If the wallet user qualifies for the promotion, the promotional server 360 may trigger a push of the money back into their account (like a ledger). Furthermore, the issuer bank does not need to share PCI data with promotional server 360 (PAN, expiry, CVC, personal data, etc.).

FIG. 4 illustrates a method 400 of seamlessly enrolling a payment account in a promotion according to an example embodiment. For example, the method 400 may be performed by a tokenization platform which may include one or more of a server, a database, a cloud storage, a user device, and the like. In some embodiments, steps of the method 400 may be distributed across multiple devices mentioned herein. Referring to FIG. 4, in 410, the method may include establishing a network communication channel between a tokenization platform and a digital wallet of a user device. For example, the communication channel may be established through the Internet, a private network, a combination thereof, and the like. The tokenization platform performing the method 400 may be the same platform that generates tokenized payment information for a payment card registered via the digital wallet on the mobile device.

In 420, the method may include transmitting a promotion from the tokenization platform to the digital wallet on the user device via the established network communication channel. For example, the promotion may include a benefit, a reward, a prize, an offer, etc., which are being provided by one or more of a digital wallet provider, an issuer, a bank, a financial institution, a merchant, or the like, via the tokenization platform. In some embodiments, the transmitting may include pushing the promotion to the digital wallet such as via an email, a SMS, or displayed directly on a user interface of the mobile device as an in-app notification. The push notification may be sent by the tokenization platform periodically, randomly, when it receives the promotion from the issuer/digital wallet, or the like. In some embodiments, the promotion may be a payment card benefit received from an issuer of a payment card stored within the digital wallet on the user device. As another example, the promotion may be a digital wallet benefit provided from a digital wallet provider of the digital wallet on the user device.

In 430, the method may include receiving authorization to accept the promotion at the tokenization platform from the digital wallet on the user device. For example, the authorization may include the user of the mobile device selecting a join option or accept option displayed via an in-app user interface of the digital wallet application. In 440, the method may include identifying tokenized payment account information of the digital wallet stored at the tokenization platform and automatically transmitting information about the tokenized payment account information of the digital wallet information from the tokenization platform to a promotion enrollment system associated with the promotion.

In some embodiments, the identifying may include identifying tokenized payment card information previously generated by the tokenization platform and provided to the digital wallet on the user device. In some embodiments, the identifying may include identifying a wallet identifier of the digital wallet on the user device, and automatically transmitting the wallet identifier to the promotion enrollment system. In some embodiments, the identifying may include detokenizing the identified tokenized payment account information and automatically transmitting the detokenized payment account information to the promotion enrollment system.

The above embodiments may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 5:
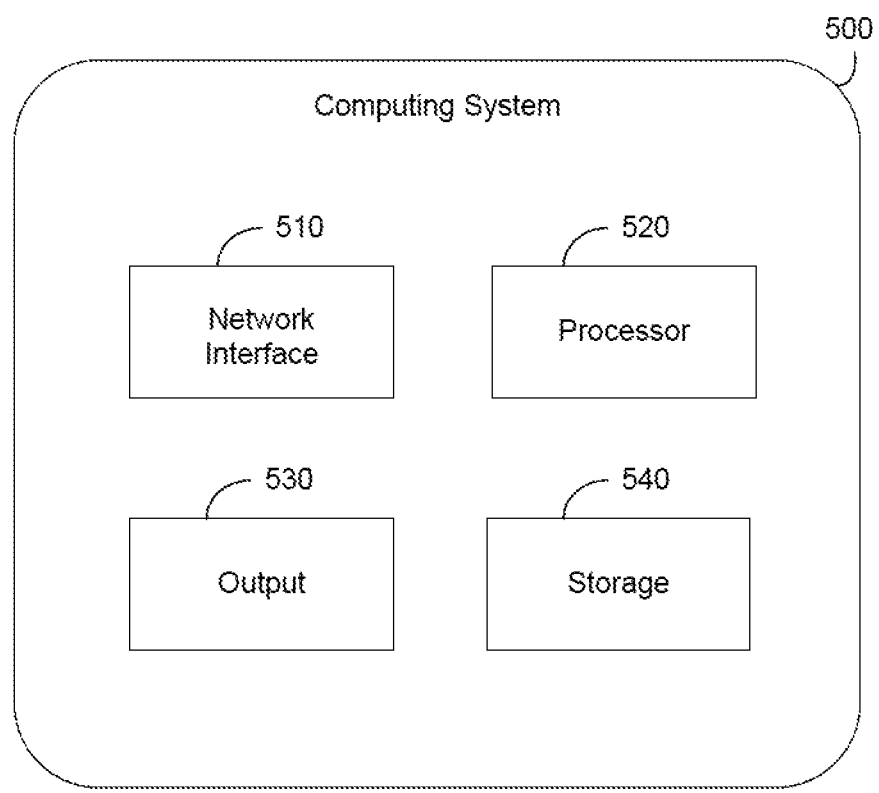
FIG. 5 is a diagram illustrating a computing system for seamless promotional enrollment according to an example embodiment.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components. For example, FIG. 5 illustrates an example computer system architecture which may represent or be integrated in any of the above-described components, etc. FIG. 5 is not intended to suggest any limitation as to the scope of use or functionality of embodiments of the application described herein. The computing system 500 is capable of being implemented and/or performing any of the functionality set forth hereinabove.

The computing system 500 may include a computer system/server, which is operational with numerous other general purpose or special purpose computing system environments or configurations. Examples of well-known computing systems, environments, and/or configurations that may be suitable for use as computing system 500 include, but are not limited to, personal computer systems, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, and the like, which may include any of the above systems or devices, and the like. According to various embodiments described herein, the computing system 500 may be a tokenization platform.

The computing system 500 may be described in the general context of computer system-executable instructions, such as program modules, being executed by a computer system. Generally, program modules may include routines, programs, objects, components, logic, data structures, and so on that perform particular tasks or implement particular abstract data types. The computing system 500 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the computing system 500 is shown in the form of a general-purpose computing device. The components of computing system 500 may include, but are not limited to, a network interface 510, one or more processors or processing units 520, an output 530 which may include a port, an interface, etc., or other hardware, for outputting a data signal to another device such as a display, a printer, etc., and a storage device 540 which may include a system memory, or the like. Although not shown, the computing system 500 may also include a system bus that couples various system components including system memory to the processor 520.

The storage 540 may include a variety of computer system readable media. Such media may be any available media that is accessible by computer system/server, and it may include both volatile and non-volatile media, removable and non-removable media. System memory, in one embodiment, implements the flow diagrams of the other figures. The system memory can include computer system readable media in the form of volatile memory, such as random access memory (RAM) and/or cache memory. As another example, storage device 540 can read and write to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, storage device 540 may include at least one program product having a set (e.g., at least one) of program modules that are configured to carry out the functions of various embodiments of the application.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Although not shown, the computing system 500 may also communicate with one or more external devices such as a keyboard, a pointing device, a display, etc.; one or more devices that enable a user to interact with computer system/server; and/or any devices (e.g., network card, modem, etc.) that enable computing system 500 to communicate with one or more other computing devices. Such communication can occur via I/O interfaces. Still yet, computing system 500 can communicate with one or more networks such as a local area network (LAN), a general wide area network (WAN), and/or a public network (e.g., the Internet) via network interface 510. As depicted, network interface 510 may also include a network adapter that communicates with the other components of computing system 500 via a bus. Although not shown, other hardware and/or software components could be used in conjunction with the computing system 500. Examples include, but are not limited to: microcode, device drivers, redundant processing units, external disk drive arrays, RAID systems, tape drives, and data archival storage systems, etc.

Referring to FIG. 5, the network interface 510 may establish a communication channel between the tokenization system and a digital wallet of a user device, and transmit a promotion from the tokenization system to the digital wallet on the user device via the established network communication channel. The processor 520 may receive, via the network interface 510, authorization to accept the promotion from the digital wallet on the user device, and identify tokenized payment account information of the digital wallet stored at the tokenization system. According to various embodiments, in response, the processor 520 may control the network interface 510 to automatically transmit information about the tokenized payment account information of the digital wallet information from the tokenization system to a promotion enrollment system associated with the promotion.

In some embodiments, the processor 520 may generate tokenized payment information based a payment card registered via the digital wallet and control the network interface 510 to transmit the tokenized payment information to the user device for storage on a secure element in association with the digital wallet. In some embodiments, the processor

520 may control the network interface 510 to push the promotion from the tokenization system to a user interface of the user device at a predefined time. In these example, the promotion may be a payment card benefit received from an issuer of a payment card stored within the digital wallet on the user device. As another example, the promotion may be a digital wallet benefit provided from a digital wallet provider of the digital wallet on the user device.

In some embodiments, the processor 520 may identify tokenized payment card information previously generated by the tokenization system and provided to the digital wallet on the user device. In some embodiments, the processor 520 may identify a wallet identifier of the digital wallet and control the network interface 510 to automatically transmit the wallet identifier to the promotion enrollment system. In some embodiments, the processor 520 may detokenize the identified tokenized payment account information and control the network interface 510 to automatically transmit the detokenized payment account information to the promotion enrollment system.

It will be readily understood that descriptions and examples herein, as generally described and illustrated in the figures, may be arranged and designed in a wide variety of different configurations. Thus, the detailed description of the embodiments is not intended to limit the scope of the application as claimed, but is merely representative of selected embodiments of the application. One of ordinary skill in the art will readily understand that the above may be practiced with steps in a different order, and/or with hardware elements in configurations that are different than those which are disclosed. Therefore, although the application has been described based upon some preferred embodiments, it would be apparent to those of skill in the art that certain modifications, variations, and alternative constructions would be apparent.

What is claimed is:

1. A tokenization system for enrolling a user in a promotion comprising:
    a token database configured to store a plurality of payment account numbers mapped to a plurality of tokenized values, respectively; and
    a processor configured to
        receive a promotion for a user from a promotion server via a network communication from the promotion server to the tokenization system,
        push a notification to a user interface of a digital wallet application open on a user device of the user, wherein the push notification appears as an in-app display notification on a user interface within the digital wallet application open on the user device,
        detect a selection of the promotion based on an input via the user interface of the digital wallet application open on the user device,
        in response to the detected selection of the promotion, reveal additional details about the promotion and a selectable element within the user interface of the digital wallet application open on the user device,
        detect selection of the selectable element, and
        automatically transmit sensitive cardholder data stored in the token database via a secure channel to the promotion server to enroll the digital wallet application in the promotion without requiring the user to submit the sensitive cardholder data via the user device.

2. The tokenization system of claim 1, wherein the tokenization system further comprises an application programming interface (API) which enables the push notification from the tokenization system to appear as the in-app display notification within the user interface of the digital wallet application open on the user device.

3. The tokenization system of claim 2, wherein the API further enables the tokenization system to display the option to enroll in the promotion on the user interface of the digital wallet application open on the user device.

4. The tokenization system of claim 1, wherein the processor is further configured to receive a payment authorization request for a payment transaction of the digital wallet application open on the user device, and in response, detokenize a payment token included in the payment authorization request and transmit the detokenized payment token and transaction details from the payment transaction to the promotion server.

5. The tokenization system of claim 4, wherein the processor is configured to receive the promotion from the promotion server and transmit the detokenized payment token to the promotion server via a same communication channel.

6. The tokenization system of claim 1, wherein the processor is further configured to identify a wallet identifier of the digital wallet application from the token database and automatically transmit the wallet identifier to the promotion server.

7. The tokenization system of claim 1, wherein the promotion is received by the tokenization system from one or more of an issuer of the digital wallet application open on the user device and an issuer of a payment card held within the digital wallet application open on the user device.

8. A method for enrolling a user in a promotion comprising:
    storing a plurality of payment account numbers mapped to a plurality of tokenized values, respectively, in a token database;
    receiving a promotion for a user from a promotion server via a network communication from the promotion server,
    pushing a notification to a user interface of a digital wallet application open on a user device of the user, wherein the push notification appears as an in-app display notification on a user interface within a digital wallet application open on the user device,
    detecting a selection of the promotion based on an input via the user interface of the digital wallet application open on the user device,
    in response to the detected selection of the promotion, revealing additional details about the promotion and a selectable element within the user interface of the digital wallet application open on the user device,
    detecting selection of the selectable element, and
    automatically transmitting sensitive cardholder data stored in the token database via a secure channel to the promotion server to enroll the digital wallet application in the promotion without requiring the user to submit the sensitive cardholder data via the user device.

9. The method of claim 8, wherein the pushing comprises transmitting the notification via an application programming interface (API) which enables the push notification to appear as the in-app display notification within the user interface of the digital wallet application open on the user device.

10. The method of claim 9, wherein the API further enables the option to enroll in the promotion on the user interface of the digital wallet application open on the user device.

11. The method of claim 8, wherein the method further comprises receiving a payment authorization request for a payment transaction of the digital wallet application open on the user device, and in response, detokenizing a payment token included in the payment authorization request, and transmitting the detokenized payment token and transaction details from the payment transaction to the promotion server.

12. The method of claim 11, wherein the receiving comprises receiving the promotion from the promotion server and transmitting the detokenized payment token to the promotion server via a same communication channel.

13. The method of claim 8, wherein the method further comprises identifying a wallet identifier of the digital wallet application from the token database and automatically transmit the wallet identifier to the promotion server.

14. The method of claim 8, wherein the receiving comprises receiving the promotion from one or more of an issuer of the digital wallet application open on the user device and an issuer of a payment card held within the digital wallet application open on the user device.

15. A non-transitory computer-readable medium storing program instructions that, when executed, cause a processor to perform a method for enrolling a user in a promotion comprising:
    storing a plurality of payment account numbers mapped to a plurality of tokenized values, respectively, in a token database;
    receiving a promotion for a user from a promotion server via a network communication from the promotion server,
    pushing a notification to a user interface of a digital wallet application open on a user device of the user, wherein the push notification appears as an in-app display notification on a user interface within a digital wallet application open on the user device,
    detecting a selection of the promotion based on an input via the user interface of the digital wallet application open on the user device,
    in response to the detected selection of the promotion, revealing additional details about the promotion and a selectable element within the user interface of the digital wallet application open on the user device,
    detecting selection of the selectable element, and
    automatically transmitting sensitive cardholder data stored in the token database via a secure channel to the promotion server to enroll the digital wallet application in the promotion without requiring the user to submit the sensitive cardholder data via the user device.

16. The non-transitory computer-readable medium of claim 15, wherein the pushing comprises transmitting the notification via an application programming interface (API) which enables the push notification to appear as the in-app display notification within the user interface of the digital wallet application open on the user device.

17. The non-transitory computer-readable medium of claim 15, wherein the method further comprises identifying a wallet identifier of the digital wallet application from the token database and automatically transmit the wallet identifier to the promotion server.

* * * * *